United States Patent [19]

Kamimaru

[11] Patent Number: 4,870,822
[45] Date of Patent: Oct. 3, 1989

[54] INTAKE AIR CONTROL SYSTEM FOR AN AUTOMOTIVE ENGINE HAVING A TURBOCHARGER

[75] Inventor: Shinji Kamimaru, Higashikurume, Japan

[73] Assignee: Fuji Jukogyo Kabushiki Kaisha, Tokyo, Japan

[21] Appl. No.: 165,928

[22] Filed: Mar. 9, 1988

[30] Foreign Application Priority Data

Dec. 3, 1987 [JP] Japan .................................. 62-058473

[51] Int. Cl.$^4$ ........................................... F02B 37/12
[52] U.S. Cl. ....................................... 60/600; 60/611; 123/564
[58] Field of Search ....................... 60/600, 601, 611; 123/564

[56] References Cited

U.S. PATENT DOCUMENTS

| | | | |
|---|---|---|---|
| 2,292,233 | 8/1942 | Lysholm | 123/559.1 |
| 4,373,337 | 2/1983 | Widmann | 60/611 |
| 4,466,414 | 8/1984 | Yoshimura et al. | 123/564 |
| 4,528,815 | 7/1985 | Arnaud | 60/600 |

FOREIGN PATENT DOCUMENTS

| | | | |
|---|---|---|---|
| 74905 | 3/1983 | European Pat. Off. | 123/564 |
| 2416287 | 10/1975 | Fed. Rep. of Germany | 60/611 |
| 2557636 | 7/1985 | France | 60/611 |
| 72627 | 5/1980 | Japan . | |
| 18519 | 2/1983 | Japan | 123/564 |

Primary Examiner—Michael Koczo
Attorney, Agent, or Firm—Martin A. Farber

[57] ABSTRACT

An intake air control system for an automotive engine having a turbocharger has a bypass provided around a compressor of the turbocharger and a control valve provided in the bypass. The control valve is connected to an accelerator pedal by a connecting mechanism. The connecting mechanism is so arranged that the control valve is opened in a low engine speed range and closed in a high engine speed range.

8 Claims, 2 Drawing Sheets

INTAKE AIR CONTROL SYSTEM FOR AN AUTOMOTIVE ENGINE HAVING A TURBOCHARGER

BACKGROUND OF THE INVENTION

The present invention relates to an automotive engine having a turbocharger, and more particularly to a system for controlling the flow of intake air for the turbocharged engine.

In a conventional turbocharged engine, a turbocharger comprising a compressor and a turbine is located between an intake manifold and an exhaust manifold. The intake air is necessarily passed through the compressor, regardless of driving conditions of a motor vehicle. The compressed air is supplied to cylinders of the engine and the flow of the compressed air is regulated by a throttle valve. In order to control compressed air in the intake system for preventing the engine from overcharging, a wastegate is provided in a bypass around the turbine.

When the throttle valve is partially opened at a partial load of the engine, the intake air supplied by the compressor is forcibly throttled. Accordingly, the pressure of the intake air between the compressor and the throttle valve is increased, so that load on an impeller of the compressor increases to reduce the rotating speed of the impeller, that is the turbine. As a result, the back pressure of the exhaust gas in an exhaust system increases. Accordingly, pumping loss increases which causes the fuel consumption to deteriorate.

When the throttle valve is fully opened, the pumping loss does not occur. However, the speed of the impeller does not increase in proportion to the increase of the opening degree of the throttle valve. Consequently, the turbocharging for the wide throttle open delays. Accordingly, in the turbocharged engine, it is desired to reduce both the pumping loss and the time lag.

Japanese Patent Application Laid-Open No. 55-72627 discloses a control system in which a bypass passage having a control valve is provided in a bypass around a compressor and a wastegate is provided in the bypass for the turbine, for controlling the flow of the intake air and the exhaust gas. The control valves are operated to be closed at acceleration of the engine.

In such a system, the pumping loss is educed at a partial opening of a throttle valve, since both of the bypasses are opened. However, at the partial load, the turbine does not operate, because exhaust gas is not applied to the turbine. Accordingly, when the throttle valve is widely opened for accelerating the engine, the turbocharging effect is greatly delayed.

SUMMARY OF THE INVENTION

The object of the present invention is to provide an intake air control system for an engine in which a control valve is provided in a bypass for a compressor so as to be operated in response to the opening condition of a throttle valve, thereby eliminating the above described disadvantages.

The other objects and features of this invention will become understood from the following description with reference to the accompanying drawings.

DETAILED DESCRIPTION OF THE PREFERRED EMBODIMENT

Figure 1:
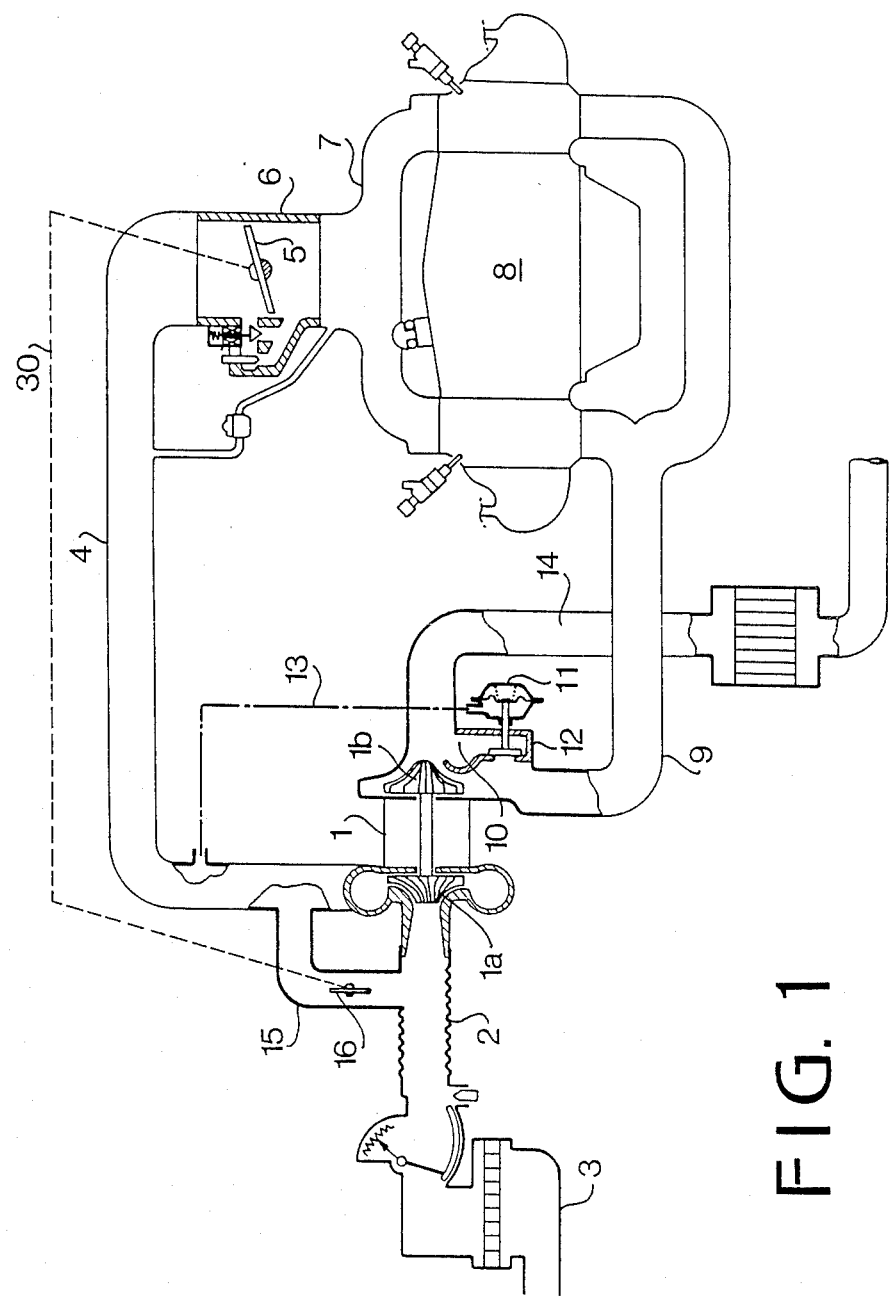
FIG. 1 is a schematic diagram showing a system of the present invention.

Referring to FIG. 1, a turbocharger 1 includes a compressor 1a having an impeller and a turbine 1b consisting of a turbine wheel. An inlet port of the compressor 1a is communicated with an air cleaner 3 through a duct 2, and an outlet port thereof is communicated with cylinders of an engine 8 through an intake pipe 4, a throttle body 6 having a throttle valve 5, and an intake manifold 7. The turbine 1b is located between an exhaust manifold 9 and an exhaust pipe 14. The impeller of the compressor is mounted on the same shaft as the turbine wheel. When the turbine 1b is operated by exhaust gas from the engine 8 through the exhaust manifold 9, the impeller is rotated by the turbine, for compressing the intake air. Thus, the compressed intake air is supplied to the engine cylinders.

An exhaust bypass 10 is provided around the turbine 1b, and a wastegate 12 which is operated by a diaphragm operated actuator 11 is provided in the bypass 10. A chamber of diaphragm operated actuator 11 is communicated with the intake pipe 4 through a passage 13 downstream of the compressor 1a. The diaphragm operated actuator 11 is controlled by pressure of the intake air in the intake pipe 4. When the pressure of the intake air becomes higher than a predetermined value, a diaphragm of the actuator is deflected to open the wastegate 12. Thus, the exhaust gas is discharged passing through the wastegate 12 without operating the turbine 1b.

An intake air bypass 15 having an intake air control valve 16 is provided around the compressor 1a. The control valve 16 is adapted to be co-operated with the throttle valve 5 by means of a connecting device 30.

Figure 2:
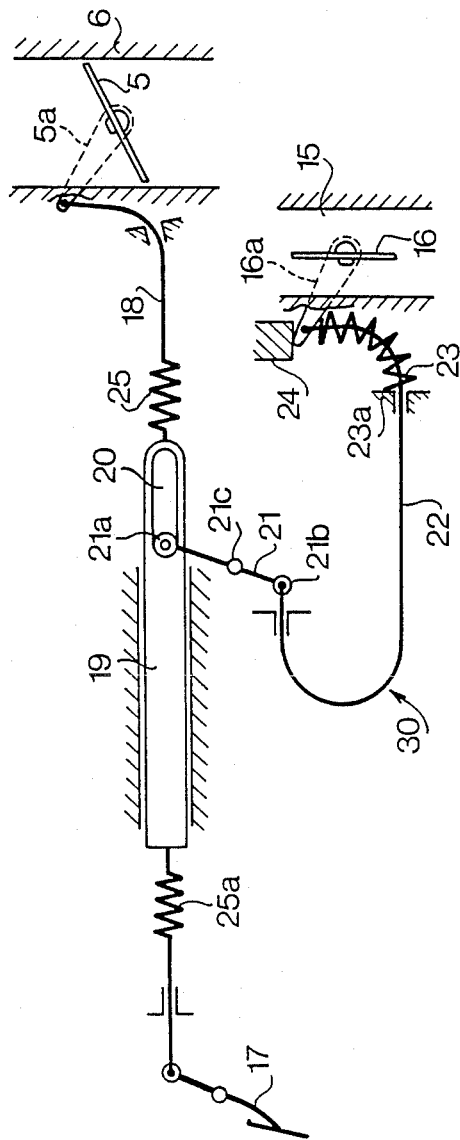
FIG. 2 is a schematic view showing a linkage arrangement between a throttle valve and an intake air control valve.

Referring to FIG. 2 showing a linkage arrangement between the throttle valve 5 and the intake air control valve 16, a throttle lever 5a of the throttle valve 5 is operatively connected to an accelerator pedal 17 of a motor vehicle through a cable 18, spring 25, connecting rod 19, and spring 25a. The connecting rod 19 has an elongate longitudinal hole 20. An end of the spring 25a is connected to the accelerator pedal 17. The connecting means 30 of the control valve 16 has a lever 21 pivotally mounted at 21c and having an engaging member 21a which is slidably engaged with the elongate hole 20 of the rod 19. A cable 22 is connected between an end 21b of the lever 21 and a lever 16a attached to a shaft of the control valve 16. A spring 23 is provided between the lever 16a and a spring retainer 23a to urge the lever to a stopper 24 to fully open the control valve 16. When the lever 21 is not pivoted, the control valve 16 is held at its fully opened position.

When the accelerator pedal 17 is released, the engaging member 21a is positioned at the left end wall of the hole 20 as shown in FIG. 2.

When the accelerator pedal 17 is depressed, the cable 18 is pulled to the left, so that the throttle lever 5a attached to the throttle shaft is pivoted. Thus, the throttle valve 5 starts to open. At this time, the rod 19 is shifted to the left, so that the elongate hole 20 is moved to the left. On the other hand, engaging member 21a of the lever 21 stays at the initial position.

When the accelerator pedal 17 is further depressed, the throttle valve 5 is fully opened. The rod 19 is further moved to the left, so that the engaging member 21a is engaged with the other end wall of the hole 20 on the right. When the accelerator pedal is further depressed, the lever 21 is turned to pull on the cable 22. The lever 16a is pivoted against the force of the spring 23 to close the control valve 16.

Figure 3:
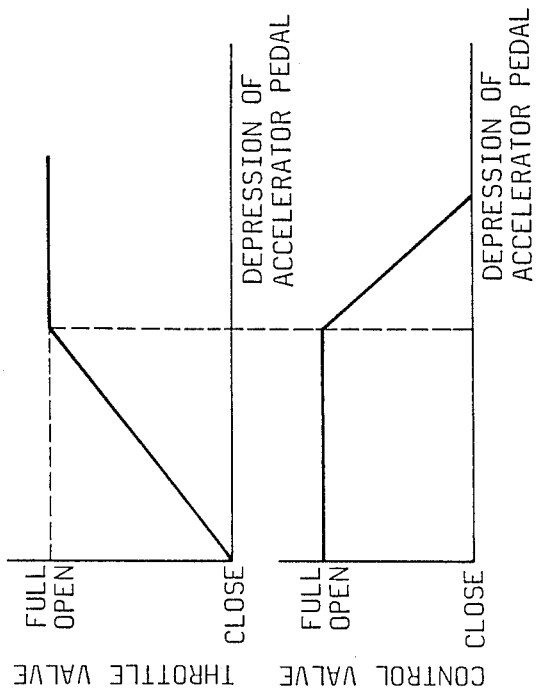
FIG. 3 shows graphs showing characteristics of the throttle valve and the control valve.

In operation, when the throttle valve 5 is at a partial opening position at a corresponding predetermined degree of depression of the accelerator pedal 17, the control valve 16 is at a full opening position as shown in FIG. 3. The air from the compressor 1a flows into the intake pipe 4. Since the throttle valve 5 is partially opened, a small amount of compressed air is passed through the throttle valve 5 and supplied to the engine cylinders through the intake manifold 7. Hence, the surplus compressed air is returned to the compressor 1a through the bypass 15. Accordingly, increase of the pressure between the compressor 1a and the throttle valve 5 is prevented, so that the load on the impeller of the compressor 1a reduces, thereby preventing the reduction of the speed of the impeller. Further, since the air is circulated through the bypass 15, the temperature of the air is raised to improve the combustion efficiency.

When the throttle valve 5 is fully opened and the accelerator pedal 17 is further depressed, the control valve 16 is closed by the connecting means 30, as described above. Thus, the compressor 1a operates to supply a large amount of air to the engine cylinders through the fully opened throttle valve 5. Thereafter, when the supercharging pressure exceeds a predetermined value, the compressed air is supplied to the actuator 11 through the passage 13. Thus, the exhaust gas applied to the turbine 1b is diverted through the wastegate 12 and flows into the exhaust pipe 14. Accordingly, the pressure of the compressed air is controlled at a constant value.

In accordance with the present invention, when the throttle valve is partially opened, since the supercharged air of the turbocharger is diverted to reduce the pressure, the pumping loss of the turbocharger can be reduced to improve the fuel consumption. Further, since the speed of the impeller of the compressor is not reduced at the partial load, the time lag in turbocharging at the change from low engine speed to high engine speed can be minimized. Furthermore, the temperature of the intake air is raised to improve the combustion efficiency of the engine.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In an intake air control system for an automotive engine having an accelerator pedal, a throttle valve provided in an intake pipe of the engine and operatively connected to the accelerator pedal by a connecting rod, a turbocharger including a turbine operated by exhaust gas of the engine and a compressor provided in the intake pipe and driven by the turbine to compress intake air, a wastegate provided in a first bypass around the turbine, and actuating means communicating with the intake pipe downstream of the compressor through a passage for actuating the wastegate when pressure of the intake air compressed by the compressor becomes higher than a predetermined value, the improvement in the system which comprises a second bypass around the compressor, a control valve disposed in the second bypass, and connecting means for operatively connecting the control valve with the connecting rod and for closing the control valve when the accelerator pedal is depressed beyond a predetermined degree, the latter representing a partial load of the engine with the control valve being open so as to return surplus of said intake air compressed by the compressor to the compressor through the second bypass so as to reduce pumping loss of the turbocharger, to minimize time lag in the turbocharger at change from low engine speed to high engine speed, and to improve combustion efficiency of the engine, and the connecting means comprises a lever operatively engaged with the connecting rod and arranged to be pivoted when the accelerator pedal is depressed beyond said predetermined degree, and a cable connected between the lever and the control valve so as to close the control valve in dependency on pivoting of the lever.

2. The system according to claim 1, wherein said connecting rod forms an elongate longitudinal hole, said connecting means comprises a cable operatively connected to the control valve, and said lever comprises a first lever connected to the cable at one end and forming an engaging member at the other end, and said engaging member slidably engages in the elongated longitudinal hole in said connecting rod.

3. The system according to claim 2, wherein said cable is connected to a second lever connected to the control valve.

4. The system according to claim 3, further comprising a stopper against which said second lever abuts in a fully opened position of the control valve, said connecting means further comprises first spring means provided between the second lever and a spring retainer for urging the second lever to abut against said stopper to fully open the control valve.

5. The system according to claim 1, further comprising a spring operatively connecting said connecting rod to the accelerator pedal.

6. The system according to claim 1, further comprising a spring operatively connecting said connecting rod to a throttle lever of the throttle valve.

7. The system according to claim 2, wherein said first lever is a two-armed lever.

8. In an intake air control system for an automotive engine having an accelerator pedal, a throttle valve provided in an intake pipe of the engine and operatively connected to the accelerator pedal by a connecting rod, a turbocharger including a turbine operated by exhaust gas of the engine and a compressor provided in the intake pipe and driven by the turbine to compress intake air, a wastegate provided in a first bypass around the turbine, and actuating means communicating with the intake pipe downstream of the compressor through a passage for actuating the wastegate when pressure of the intake air compressed by the compressor becomes higher than a predetermined value, the improvement in the system which comprises
- a second bypass around the compressor,
- a control valve disposed in the second bypass, and
- connecting means for operatively connecting the control valve with the connecting rod and for closing the control valve when the accelerator pedal is depressed beyond a predetermined degree, the latter representing a partial load of the engine with the control valve being open so as to return surplus of said intake air compressed by the compressor to the compressor through the second bypass so as to reduce pumping loss of the turbocharger, to minimized time lag in the turbocharger at change from low engine speed to high engine speed, and to improve combustion efficiency of the engine, and
- said connecting means is for substantially linearly closing the control valve with respect to increased depression of the accelerator pedal when said throttle valve is opened.

* * * * *